United States Patent
Eisenberg et al.

(10) Patent No.: US 7,979,528 B2
(45) Date of Patent: Jul. 12, 2011

(54) SYSTEM AND METHOD FOR TRAVERSING FIREWALLS, NATS, AND PROXIES WITH RICH MEDIA COMMUNICATIONS AND OTHER APPLICATION PROTOCOLS

(75) Inventors: Alfred J. Eisenberg, Francestown, NH (US); John A. Thompson, Holmdel, NJ (US); David O. Bundy, Bedford, NH (US)

(73) Assignee: Radvision Ltd., Tel Aviv (IL)

( * ) Notice: Subject to any disclaimer, the term of this patent is extended or adjusted under 35 U.S.C. 154(b) by 326 days.

(21) Appl. No.: 10/402,752

(22) Filed: Mar. 27, 2003

(65) Prior Publication Data

US 2003/0188001 A1    Oct. 2, 2003

Related U.S. Application Data

(60) Provisional application No. 60/367,826, filed on Mar. 27, 2002.

(51) Int. Cl.
*G06F 153/173*    (2006.01)
(52) U.S. Cl. .......................................... 709/224; 714/18
(58) Field of Classification Search .................. 709/201, 709/203, 221–226, 227, 228, 229, 231; 713/200, 713/201, 150–155; 714/18
See application file for complete search history.

(56) References Cited

U.S. PATENT DOCUMENTS

| | | | | |
|---|---|---|---|---|
| 5,557,798 A * | 9/1996 | Skeen et al. | | 705/35 |
| 5,799,016 A * | 8/1998 | Onweller | | 370/401 |
| 5,896,402 A * | 4/1999 | Kurobe et al. | | 714/748 |
| 5,941,954 A * | 8/1999 | Kalajan | | 709/239 |
| 5,968,116 A * | 10/1999 | Day et al. | | 709/202 |
| 5,999,979 A | 12/1999 | Vellanki et al. | | 709/232 |
| 6,075,796 A * | 6/2000 | Katseff et al. | | 370/466 |
| 6,219,694 B1 * | 4/2001 | Lazaridis et al. | | 709/206 |
| 6,289,402 B1 * | 9/2001 | Davis | | 710/31 |
| 6,349,336 B1 | 2/2002 | Sit et al. | | 709/227 |
| 6,389,462 B1 * | 5/2002 | Cohen et al. | | 709/218 |
| 6,438,125 B1 * | 8/2002 | Brothers | | 370/352 |
| 6,571,095 B1 * | 5/2003 | Koodli | | 455/435.1 |
| 6,604,154 B1 * | 8/2003 | Takegami et al. | | 710/52 |
| 6,608,696 B1 * | 8/2003 | Iimoto et al. | | 358/1.15 |

(Continued)

FOREIGN PATENT DOCUMENTS

WO    WO 02/00302    1/2002

(Continued)

OTHER PUBLICATIONS

Deploying H.323 Conferencing on Your IP Network—Seeing, Hearing, and Sharing Across Networks, First Virtual Communications, 2000.

(Continued)

*Primary Examiner* — Peling A Shaw
*Assistant Examiner* — Ninos Donabed
(74) *Attorney, Agent, or Firm* — Byrne Poh LLP

(57) ABSTRACT

A tunneling system and method is described for traversing firewalls, NATs, and proxies. Upon a request from a device on the secure private network or on a public network such as the Internet, a connection to a designated or permitted device of the secure private network by way of the public network can be established, allowing selected devices of the private network to access devices on the public network. A bi-directional channel can be established where information such as rich multimedia and real-time voice and video can be accessed or communicated.

20 Claims, 9 Drawing Sheets

U.S. PATENT DOCUMENTS

| | | | |
|---|---|---|---|
| 6,667,968 B1* | 12/2003 | Tran | 370/352 |
| 6,931,018 B1* | 8/2005 | Fisher | 370/401 |
| 7,010,590 B1* | 3/2006 | Munshi | 709/224 |
| 7,082,103 B2* | 7/2006 | Schieder et al. | 370/231 |
| 7,266,613 B1* | 9/2007 | Brown et al. | 709/235 |
| 7,299,294 B1* | 11/2007 | Bruck et al. | 709/235 |
| 7,515,525 B2* | 4/2009 | Appanna et al. | 370/217 |
| 7,603,408 B1* | 10/2009 | McGinnis et al. | 709/203 |
| 2002/0147800 A1* | 10/2002 | Gai et al. | 709/221 |
| 2002/0186683 A1 | 12/2002 | Buck et al. | 370/352 |
| 2002/0191612 A1 | 12/2002 | Curtis | 370/392 |
| 2003/0009571 A1 | 1/2003 | Bavadekar | 709/230 |
| 2003/0041140 A1* | 2/2003 | Matsumoto | 709/223 |
| 2003/0093691 A1* | 5/2003 | Simon et al. | 713/201 |
| 2003/0126284 A1* | 7/2003 | Houston et al. | 709/238 |

FOREIGN PATENT DOCUMENTS

| | | |
|---|---|---|
| WO | 2007/046596 A1 | 4/2007 |

OTHER PUBLICATIONS

CUseeMe Web—The Next Revolution of Internet Communications, First Virtual Communications, 2000.
CUseeMe Conference Server—Technical Overview, First Virtual Communications, 2000.
Firewalls—Implementing IP-based Videoconferencing through a Firewall, First Virtual Communications, 2000.
Linking Topology Considerations—Optimizing Bandwidth and Latency, First Virtual Communications, 2000.
Linking & Cascading Conference Servers—An Overview and Tutorial, First Virtual Communications, 2000.

* cited by examiner

SYSTEM AND METHOD FOR TRAVERSING FIREWALLS, NATS, AND PROXIES WITH RICH MEDIA COMMUNICATIONS AND OTHER APPLICATION PROTOCOLS

CROSS REFERENCE TO RELATED APPLICATIONS

This application is a non-provisional application claiming the benefits of provisional application No. 60/367,826, filed Mar. 27, 2002, titled "System and Method for Traversing Firewalls, NATs, and Proxies with Rich Media Communications and Other Application Protocols".

FIELD OF THE INVENTION

This invention relates generally to traversing communication network firewalls, NATs and proxies, and more particularly, relates to a novel tunneling approach using endpoint plug-ins that permit UDP-based or other connectionless-based protocol information from a public or private network to traverse firewalls, proxies and NATs emulated in real-time by encapsulating UDP-based information on a connection layer to appear as TCP-based or full duplex connection-based communication.

BACKGROUND OF THE INVENTION

The Internet allows geographically and logically dispersed applications and nodes to easily communicate and exchange data. These data can range from simple text messages to encrypted or compressed high bandwidth real-time voice and video data. But with the ease of networking, also introduced are potential security threats to any computer publicly accessible on the Internet.

Traditionally, network security has been achieved simply by denying or restricting those outside a secure network access to data or devices within the secure network. Over time, common solutions have evolved, such as firewalls, NATs, and proxies. These approaches block or restrict unauthorized incoming data and unauthorized incoming requests from devices on a private network.

Firewalls isolate devices of a private network from public network devices. Firewalls are installed as security to protect data inside a private network from unsolicited connections. Firewalls can also restrict the way nodes inside a private network can access public sites, such as those on the Internet.

One technique for establishing a firewall is to maintain an "access control list." An access control list approach compares address information contained in a data packet from a remote device to determine whether the source from which the packet originated is on a list of allowed or disallowed addresses. If the address is on the list of disallowed addresses, the packet is not allowed to pass.

Another method of restricting access involves "packet filtering". Packet filtering examines data traversing a firewall to determine if the port or protocol (e.g. Internet Protocol (IP)) is subject to restrictions. If the port or protocol in use is restricted, the packet is not allowed to pass.

Another approach for providing network security uses a NAT (Network Address Translation) technique. NAT involves the translation of IP addresses used within one network to a different IP addresses known within another network.

Typical NAT techniques map local or private network addresses to one or more public IP addresses, and translate incoming global IP addresses into local IP addresses. NAT techniques provide added security since each outgoing or incoming request must go through a translation process to qualify or authenticate the request or match it to a previous request. To preserve the number of IP addresses needed, it is common for a private network use a single IP address in its communication outside the private network. Thus, external devices may not be able to identify or communicate with a specific local device because private addresses behind NATs are not directly accessible by entities on a public network.

Another approach for providing network security is based on proxies. Proxies, such as HTTP proxies, act as the only path out from a private network to the public domain. Proxies are generally done through one or two ports and may require authentication and/or encryption to achieve secure connections. The proxy acts as an intermediary between the secure private network and the public.

For example, referring to FIG. 1, a local client 1 and a remote server 3 are coupled over a public network 5, such as the Internet. The proxy server 7 receives a request for an Internet service (such as a Web page request from a remote server 3) from the client 1. If the request passes filtering requirements, the proxy server 7 processes the request and forwards the request to remote server 3. To the local user, the proxy server 7 is transparent, and all Internet requests and returned responses appear to be associated directly with the addressed remote server 3. The proxy server 7 acts as a firewall by preventing unauthorized incoming data requests from being processed.

A common theme for firewalls, NATs and proxies is that most bi-directional communication must be initiated from inside the private network towards a public IP address, potentially on restricted ports or with restricted protocols. Once connections or virtual circuits are created from the inside out, data may flow back on that same path from the public network to the private network.

However, for end-to-end rich media applications, such as videoconferencing, methods for initiating and maintaining a session through a gateway or firewall can be complex, requiring several channels to the same or different destinations just to establish a two-way or multi-way real-time conference. Standard protocols such as H.323, SIP and proprietary protocols such as First Virtual Communications' CUseeMe protocol are examples of protocols supporting these types of applications. For example, the International Telecommunications Union H.323 standard defines how real-time, bi-directional multimedia communications can be exchanged on packet-based networks. The H.323 protocol utilizes a User Datagram Protocol (UDP) for the transport of voice and video data. As opposed to a "reliable" type of transmission, or so-called "connected" stream-oriented protocol, such as Transmission Control Protocol/Internet Protocol (TCP/IP), the UDP is a connectionless packet-oriented transfer protocol. Some standards, such as H.323, use connection-based TCP/IP for call or connection setup, but do not use TCP/IP for audio and video data transmission. In contrast, TCP is used for reliable transfer of data and has built in packet loss detection and retransmission and thus is not appropriate for real-time audio and video data.

When a public network transmission utilizes a connectionless type of protocol, like UDP as a transport for the voice and video data packets, the incoming and outgoing packets are often blocked by the firewall security. As a result, connectionless type communications with third parties outside a private network are commonly disabled or blocked. For example, firewalls usually prevent incoming TCP and UDP connections. With firewalls, UDP may be blocked in both directions, while TCP may be blocked except for specific ports.

Internet communications standards and proprietary rich media applications usually require multiple communications channels via UDP and TCP on fixed or random ports. Particularly for real-time rich media communication like voice and video communication, there is a need for a system that allows the establishment of communication channels between computers protected by a firewall and outside third parties, but without compromising the firewall security measures set up to protect against unauthorized or non-permitted data transfers.

Therefore one objective of the present invention is to provide a method and computerized system for transmitting and receiving real-time voice, video and other data over the Internet when either an intended sender or recipient of data utilizes a computer device that is protected by a firewall that does not allow transmissions of data, including data using connectionless packet protocol.

BRIEF SUMMARY OF THE INVENTION

A method and computerized system are provided for transmitting and receiving voice, video, and other data over the Internet and allowing the exchange of TCP/IP and/or UDP type data packets through tunnel connections created between devices on opposite sides of a firewall. The tunnels are created using TCP/IP to a single destination port to encapsulate multiple channels of TCP and UDP data destined to various other ports, across a firewall, NAT or HTTP Proxy, as well as emulate real-time performance for UDP data channels.

The present invention provides plug-in solutions for applications over a client, server, desktop system or other endpoints. In an embodiment of the present invention a plug-in is installed on a device to establish and maintain a TCP/IP tunnel between any two devices having a matched, or paired, plug-in; the tunnels are created over transport layers to support the exchange of TCP and UDP data, solicited or unsolicited, by encapsulating the UDP or TCP data and an additional header as the payload to the TCP stream. The present invention discloses a system and approach for tunneling any application port to a destination IP address once the tunnel is created. Virtually any packet blockage by a firewall, NAT or proxy can be avoided by the tunneling techniques disclosed herein.

In addition, the present invention discloses an approach that is OS and protocol independent but that also allows users to plug-in protocol specific logic for applications that do not perform or behave well through NATs.

The present invention provides plug-ins for download and install on client endpoints and external servers where separate gateways or proxy servers are not needed to connect devices behind a firewall with external devices on a public network.

Additionally, while user registrations can be supported, such registrations through a gateway or proxy server are not required. The plug-ins of the present invention can be automatically downloaded and installed concurrently upon a request to access an application. The plug-in operates transparently to the user and works with existing applications.

Moreover, this invention provides plug-ins for client endpoints in private networks to provide access to conferencing and multimedia services available over a public network and receive incoming calls and invitations from services outside a private network.

Further, the plug-in can be downloaded and installed on devices within corporate networks. Also, the plug-ins can be downloaded and installed by multiple users to generate multiple tunnels for on-line groups, conference calls, web-based presentations, etc. Users on a system can be differentiated even if multiple users are assigned the same private IP address and/or have IP addresses that are translated by a NAT.

It is to be understood that both the foregoing general description and the following detailed description are exemplary and explanatory only and are not restrictive of the invention, as claimed.

BRIEF DESCRIPTION OF THE DRAWINGS

FIG. 2b shows a diagram of the a system for providing network communications in accordance with the invention, where a first endpoint communicates to another endpoint through a tunnel plug-in;

FIG. 6 depicts network and stacks layers involved in communication between endpoints having a proxy interposed between;

DETAILED DESCRIPTION

Figure 1:
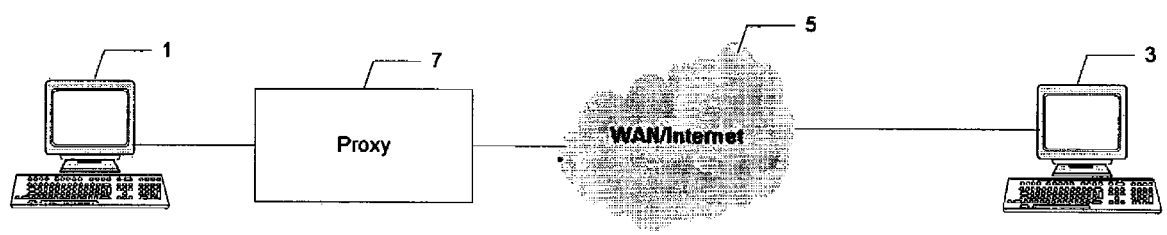
FIG. 1 is a block diagram of a prior art computer system having a local client coupled to the Internet through a proxy or gateway server.

Reference will now be made in detail to the present embodiments of the invention, examples of which are illustrated in the accompanying drawings.

Reference to any specific operating system architecture (such as Microsoft® Windows™) is for demonstration purposes only as to how the present invention could be implemented. In addition, the terms 'client' and 'server' are for functional description only, since communication based on the tunneling approach disclosed supports bi-directional communication.

Network-based systems such as online conferences, online meetings, web seminars and application-sharing applications may depend on conditions associated with a client and server host system. Some components of a network-based application, including configuration information, may be previously installed on a client. Alternatively, the components and configuration information may be concurrently installed on the client as a network-based application is executing.

When a device behind a firewall attempts to make a connection over the Internet using a connectionless or connection-based packet-oriented protocol several issues may arise. For example, when an outside third party intends to establish data communication with someone behind a firewall using either protocol it is often not known at the time when a connection is desired or requested whether a two-way transfer of voice data using the protocol is allowed by the network security system.

Additionally, a firewall may restrict a device behind a network security device (e.g., firewall, NAT, or proxy) from originating connection to an outside device or network, or may prevent connections generated from an external device to a device behind network security device. Further, it is often difficult to implement an unreliable data channel, like UDP, inside a TCP connection due to the reliable nature of TCP (e.g., a reliable connection typically includes retransmit requests for missing or dropped data).

The present invention addresses these and other concerns through a novel tunneling protocol. Tunneling allows the establishment of bi-directional connections or tunnels, initiated from inside or from outside a private network. Tunneling is a technique used in network communications where a first protocol is "wrapped" or encapsulated within a second protocol. For example, a new header from a second protocol is attached to the first packet. The entire first packet of a first protocol becomes the payload of a second protocol. In this way, traffic of a first protocol can be carried over a network that does not support that first protocol directly.

"Tunneled data" refers to data or packets from one protocol that are encapsulated within another protocol. A "tunnel" herein refers to a communication channel between two networked devices through which tunneled data are communicated.

Tunnels are created at the application level. One aspect of the present invention relies on UDP packets targeted for a predetermined or otherwise determinable destination port being intercepted and encapsulated in a TCP tunnel. The encapsulation happens at the driver level by inspection of IP headers of outgoing data, and repackaging them as payload data inside a TCP packet.

The method and system described involve using two plug-in components to create a bi-directional tunnel between a client application endpoint inside a network separated from a public server by a network security device. This public server may also be behind a firewall, but it must be reachable through a public address, whether it is a statically mapped address behind a NAT or not. Using the tunneling approach of the present invention, voice, video and other data communication may be initiated from within or outside a firewall on a transport layer using a connection-based full duplex protocol to encapsulate connection-based or connectionless data in real-time across a firewall, as well as provide other benefits and features as described below.

For purposes of this disclosure, the following definitions shall apply:

Automatic Firewall Detection (AFD)—The process by which a plug-in at a client determines the best path of communication from it's network environment to the public domain.

Client—In reference to a tunnel, the end of the tunnel that initiates the tunnel creation to the server.

Distributed Proxy (DPX)—A tunneling proxy that may be associated with multiple endpoint. Also called a full proxy.

Personal Proxy (PPX)—A component on a computer which can be configured to be associated with and a tunneling proxy for one single external endpoint for an application protocol.

Server or Service—In reference to a tunnel, the end of the tunnel that receives a tunneled connection.

TCP Stack Plug-in (TSP)—The TSP is a component of the TP installed just below the socket level which on the client side, intercepts TCP and UDP requests from an application, performs AFD and tunnel creation, and sends commands to the TDP to signal which subsequent TCP and UDP requests to tunnel. The TSP may also resolve any NAT issues which require translating application protocol-specific data, such as H.323 protocol. On the server side, the TSP listens for tunnel connections on a tunnel port (e.g. 443, the default tunnel port which is HTTPS), and signals the TDP with information necessary to identify the tunnel (source IP and port).

Tunnel Plug-in (TP)—The TP is a full set of components in accordance with an embodiment of the invention needed for one endpoint to support and allow tunneling with another endpoint.

Tunneling Driver Plug-in (TDP)—The TDP is a component of the TP installed at a driver level (e.g., NDIS Intermediate driver on Windows™) that accepts commands from the TSP and manages the tunneling protocol (for example, managing the protocol includes bi-directional UDP emulation within a TCP tunnel). This component also snoops TCP/IP protocol for information required to reconstruct data stream or datagrams on the receiving side of a tunneled session.

Tunnel Port—The TCP/IP port used to establish a tunnel between a client and server.

Tunneling Proxy (TPX)—A component on a computer that routes tunneled data between an associated endpoint and a target endpoint.

Type I Data—Connection-oriented data, such as TCP data.

Type II Data—Connectionless data, such as UDP data. Generally Type II data will not be retransmitted as is typically done for Type I data.

Figure 2A:
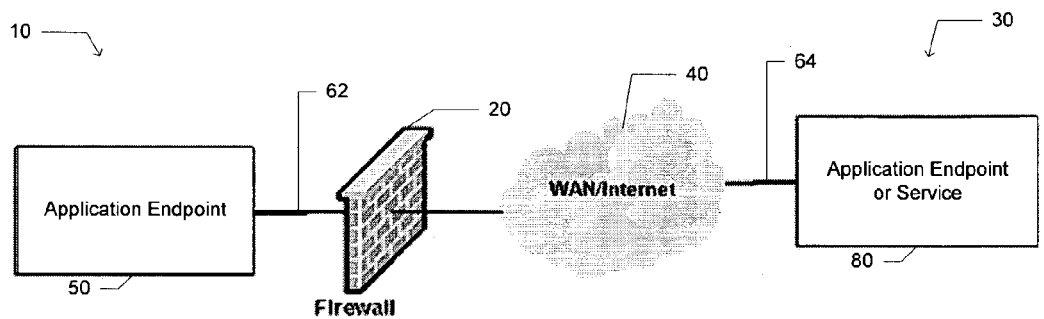
FIG. 2a shows a simplified diagram of a system having a firewall interposed between communication endpoints.

Referring to FIG. 2*a*, in a private network 10 an application endpoint 50 is protected by a firewall 20. The firewall may be a proxy server that blocks incoming TCP or UDP data on various ports from or to the internal application endpoint 50. The firewall may prevent voice, video and other data transmissions from unknown third parties outside the firewall, such as the computer system 30 or the application service endpoint 80, which transmit data over a WAN/Internet 40 or other public network. In addition, the firewall 20 may also block outgoing UDP or TCP data packets that may be sent from application endpoint 50 to an application service endpoint 80. Computer system 30 may also be protected by its own firewall (not shown).

Connections 62, 64 may include routers, switches and other transmission devices for communicating data packets and which support a wide variety of technologies, including dedicated wire connections, dial-up connections, DSL, cable, and satellite links.

Figure 2B:
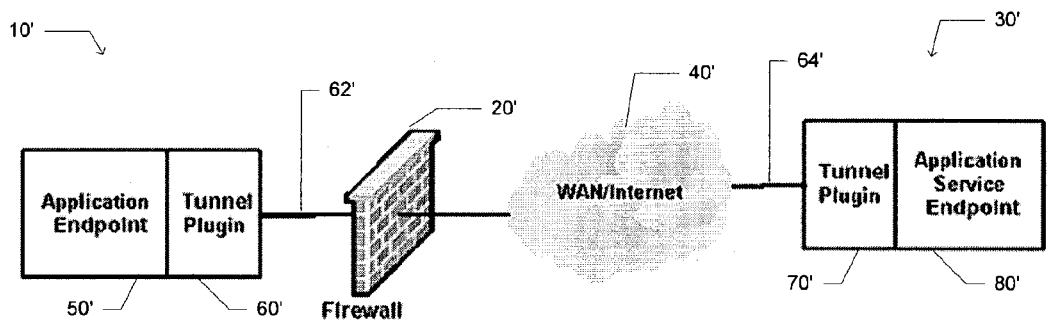

Referring to FIG. 2*b*, in one embodiment of the present invention, private network 10' is protected by a firewall 20' that blocks incoming UDP data packets to the internal application endpoint 50'. Elements of FIG. 2*b* correspond to similarly numbered elements of FIG. 2*a* that differ only by a prime. For instance, firewall 20' interposed between the application endpoint 50' and application service endpoint 80' corresponds to the firewall 20 of FIG. 2*a*.

The tunnel plug-ins (TP) 60' and 70' are key differences in the overall architecture of FIG. 2*b*, as compared to FIG. 2*a*. The TP 60', 70' are OS-independent components and may be implemented on a personal computer running Windows™, Macintosh® OS, Linux, UNIX, etc. Device 10' may be a personal digital assistant, a laptop, web-enabled phone or network accessible device. The application endpoint 50' and service endpoint 80' may provide application content to and from devices such as a speaker, a display, a microphone and a camera (none shown).

The TP 60', 70' may be coupled to the firewall 20' or network 40' over connections 62', 64' using a wide variety of technologies, including dedicated wire connections, dial-up connections, DSL, cable, and satellite links. Connections 62', 64' may include routers, switches and other transmission devices for communicating data packets. WAN/Internet 40 may comprise other nodes (not shown) which route communication between TP 60' and 70'.

Each plug-in component 60' and 70' consists of two components: a Tunneling Driver Plug-in (TDP) and a TCP/IP Stack Plug-in (TSP). In the case where an endpoint 50' or 80' is a server or service endpoint, the TSP comprises a tunneling listener module as part of the plug-in 70' which handles accepting and maintaining the tunnel connections at the application level, as well as responding to the UDP probes for the detection of a firewall 20'. For example, the server listener can track where communications are coming from and going to and "listen" for communications received over predetermined TCP port(s).

The TDP components of TP 60', 70' are implemented at the network interface driver level (e.g. NDIS intermediate driver on Windows™). A driver layer refers to a part of the operating system that interacts with a particular device or software and contains information about the device or software interface. For example, for PCs, a driver can be packaged as a .SYS file. Multiple connections may or may not be multiplexed over a single tunneled connection at a driver layer.

In the present embodiment, the TDP is responsible for tunneling two types of data: TCP (Type I) and UDP (Type II) data streams. On the client side, the TDP accepts commands from the TSP, which intercepts socket calls using specific ports to support tunnels to a destination server endpoint and manage the tunneling protocol.

In an embodiment where client or server receives tunneled data, the TDP inspects TCP/IP protocol headers for information required to reconstruct data stream or datagrams. On the server side, the TSP listens on the currently configured tunnel port for incoming tunnel connections from a client endpoint. The TSP listens for and accepts tunnel connections; the TDP snoops incoming IP headers and reconstructs datastreams or datagrams if it finds a tunneled packet.

As noted, the TDP in accordance with the present invention is responsible for tunneling two types of data: Type I and Type II. Type I data refers to data normally sent by an application using the TCP/IP protocol, which is a reliable connection based protocol.

Type II data is connectionless data such as UDP. For example, Type II data can refer to data normally sent by an application using the UDP/IP protocol, which is an unreliable connectionless protocol. Since Type II data is sent with an unreliable protocol, it is assumed that the application does not want the implied overhead and potential latency introduced with a reliable connection-based protocol like TCP/IP. Low overhead/latency is accomplished by making sure no data is retransmitted, whether or not it makes it to the other end of the tunnel.

Turning to the other component of the TP of the present invention, the TSP component of the plug-in is inserted just below the socket layer of a TCP/IP stack and monitors requests of TCP/IP and UDP ports by applications. The TSP may be implemented in one of several ways. For example, the TSP may be implemented as a socket shim like a Winsock Layered Service Provider. This shim will watch all outgoing ports. If there is a TCP connection and/or UDP datagram sent on a port of interest, the shim will perform an AFD ("Automatic Firewall Detection," described below), create a tunnel if necessary, and send commands to the TDP regarding which TCP and UDP port(s) to specific IPs will be tunneled.

Another approach for implementing the TSP component may be for an application to integrate TSP functionality directly into its logic and call the appropriate tunneling API for AFD, tunnel creation, and signaling to the TDP. In this approach, the application would be responsible for any packet translation necessary.

A plug-in may act both as a client and server on any endpoint, but generally a client TP refers to the initiator of communications that may require a tunnel, and the server TP refers to the receiver of that initial communication. Unless otherwise indicated, any reference to UDP or other connectionless protocol shall equally apply for any other connectionless protocol. Reference to TCP or other connection-based protocol shall equally apply to any full duplex or connection-based protocol. It should be noted that the present approach of encapsulating UDP in TCP is not a restriction on the protocol encapsulation, as a TP in accordance with the present invention can apply to other connection and connectionless protocols.

Regardless of whether data is Type I or Type II, the TP can tunnel through when necessary. When it is determined that a tunnel is necessary to complete the desired connection, a tunnel is created on a tunnel port and only connections and data signaled to the TDP from an application client to a server are wrapped in a tunneling header and sent through the tunnel connection.

Unlike TCP, UDP offers a limited amount of service when messages are exchanged between computers in a network. For example, while UDP can handle packet fragments and reassemble them if they come in the right order, UDP cannot handle missing or out of order packets. For example, UDP does not provide sequencing of the packets for arriving data. As a result, generally any application program that uses UDP must be able to make sure that the entire message has arrived and is in the right order. However, due to contemporaneous nature of applications as real-time voice and video transfer, it is not usually required or desirable to use resources for re-transmission of data if some information is not properly transferred. For example, in one embodiment of the present invention, identifier packets (e.g., dummy packets or packets of a known sequence) are sent in response to retransmission requests and where the receiving side knows to discard or ignore such packets. Further details and algorithms for addressing retransmission considerations are provided below.

In a full tunnel plug-in configuration, the TP is installed on both ends of a connection. For example, TP 60', 70' is installed with both TDP and TSP installed and having control over data sent over the connection between endpoints 50' and 80'. In this mode, the TP emulates a TCP datastream for every packet. When it is determined that a tunnel is necessary to get UDP datagrams from one endpoint to another, a tunnel is created on a tunnel port and all data from the client to a server are wrapped in a Type I data tunneling header and sent through the tunnel. Multiple datastreams may or may not be multiplexed over a single tunneled connection, but there is only one header for both TCP and UDP with a field that indicates the type of data.

Figure 5:
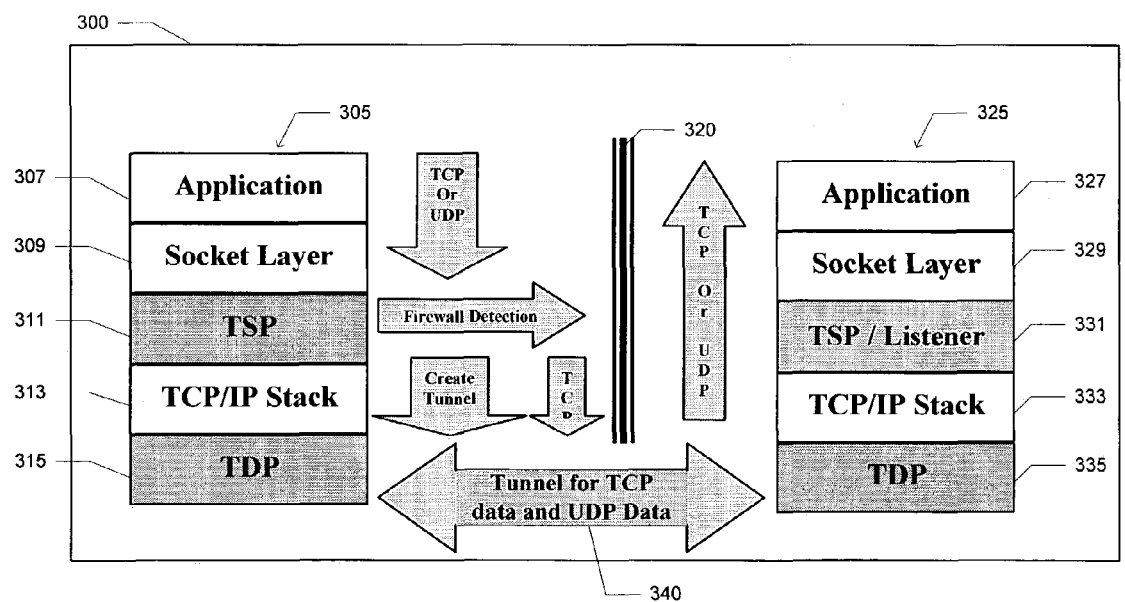
FIG. 5 depicts network and stacks layers involved in communication between endpoints.

Referring now to FIG. 5, there is shown a communication system 300 FIG. 5 also depicts the interaction of stacks layers involved in a communication link, for example between an application endpoint 50' and application service endpoint 80'.

System 300 represents communication between a device 305 and destination device 325 on opposite sides of a firewall 320. TDP and TSP are deployed in system 300 and operate to exchange UDP data under the guise of TCP. Source device 305 and destination device 325 comprise network layers which perform different application endpoint functions and which communicate endpoint data through to other layers at the endpoint. For purposes of this disclosure, the source device will be described as layers for a client and the destination device will be described as a server. Other configurations are possible and can easily be implemented over the Internet in a manner understood by one skilled in the art based on the application of the teachings herein to each endpoint within a communication system.

The source device 305 includes a source application layer 307, a source socket layer 309, source TSP 311, source TCP/IP stack 313 and source TDP 315. Destination device 325 includes a destination application layer 327, a destination socket layer 329, listener 331, destination TCP/IP stack 333 and destination TDP 335. Various approaches for implementing and handling these layers of both devices are understood by those skilled in the art.

In the case of a server destination device 325, the TSP of the service-side TP is configured as a listener 331 to "listen" for TCP/IP connections on a determinable tunnel port. Several methods to implement the server side functionality of the TSP (i.e., the listener functionality) are possible. For example, the tunnel port can be set by default as 443, the default connection-based HTTPS port. However, designation of port 443 as default could conflict with a standard web server (like Microsoft IIS) which may be listening on this port.

Alternatively, systems that do not have a web server that supports HTTPS, a server TSP can be implemented as a separate process or system service that listens on a determinable port and accepts tunnel connections thereupon. If there is a web server present, a servlet could accept and maintain a persistant HTTPS connection, signaling the server-side TDP when tunneled data arrives.

In either case, the server-side listener uses an OS transport stack to accept the initial tunnel connection.

If the stack layer 325 were being described for a client, the listener is not required, and the listener 331 would correspond to a TSP 311'.

Application layers 307, 327 are not necessarily the endpoint applications themselves but generally are the layers at which certain communication features are performed such as partner identification, user authentication and quality of service level establishment.

The socket layers 309, 329 are used by the application layers 307, 327 to communicate TCP or UDP-based data. The socket layers contain sets of programming requests, or "function calls" such as application programming interfaces (APIs). Common APIs include the Berkeley UNIX C interfaces for sockets.

The TSP layers 311, 331 incorporate and implement TCP protocols, perform firewall detection and establish tunnels. In one embodiment, the tunnel is created by TCP 311 as the TCP 311 looks for an outgoing connection to the destination stack 325. Where a firewall 320 is present, UDP data links are not established between the client and server. Instead, the TSP layer 311 creates and maintains a tunnel 340 through the firewall 320. The TDP layers 315, 335 incorporate and implement the TDP component described above. Tunnel 340 appears as TCP-based communication. Thus, data transmitted through tunnel 340 can traverse the firewall 320 via an open TCP port or TCP port of choice. Once a channel is created between source device 305 and destination device 325 based on the TP, Type I and Type II data can be exchanged. The tunneled data received by the destination device 325 can be unpackaged and sent up the stack as TCP or UDP data.

Tunnel 340 supports UDP and TCP data, as well even where an application endpoint port may be blocked or incoming connections to a client or host are not allowed. In this embodiment, any application port can be tunneled to a destination IP address once the tunnel 340 is created. In other words, virtually any protocol blocked by a firewall can be tunneled by the TP.

Figure 9:
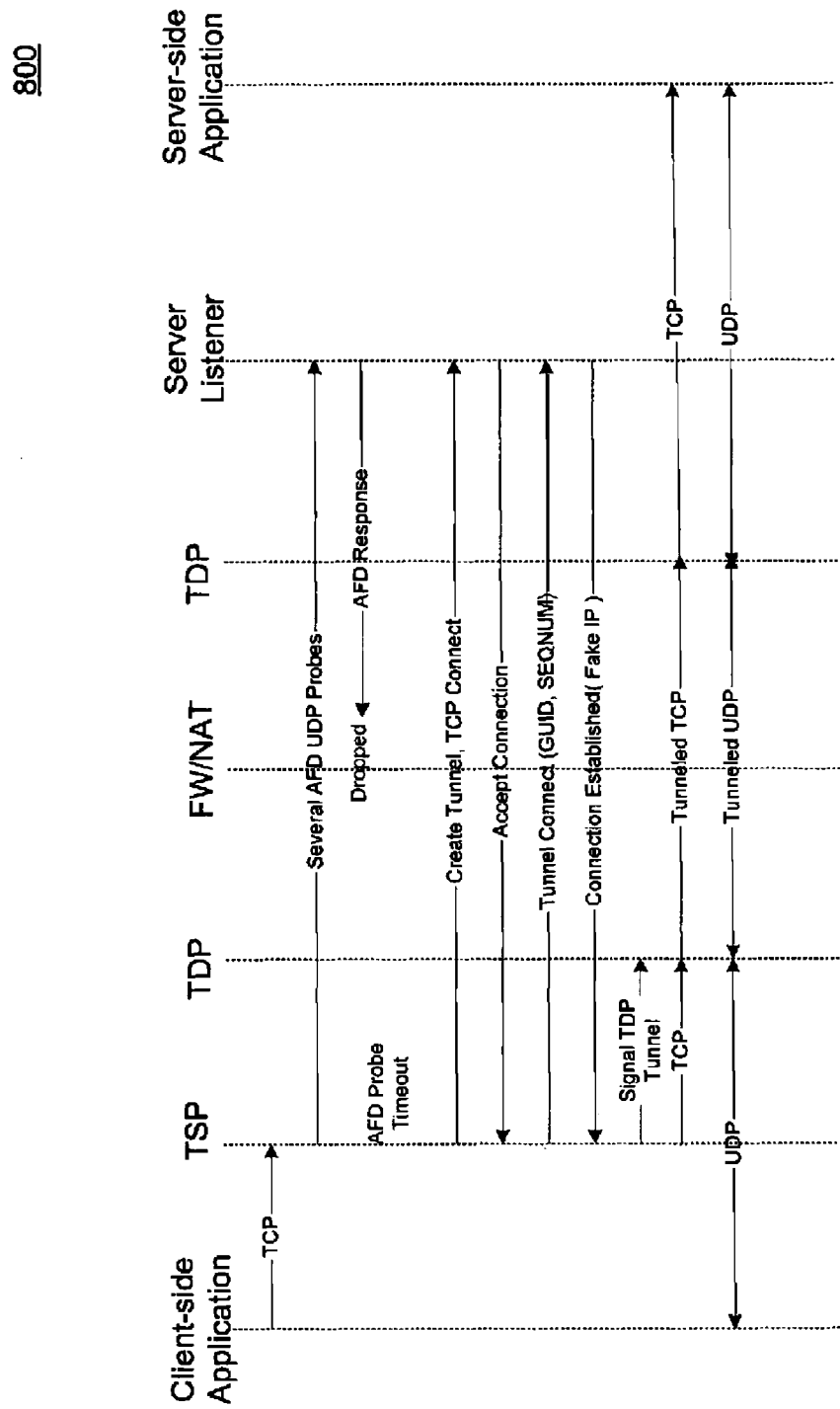
FIG. 9 represents a data flow diagram depicting an exchange of data between a client-server through a NAT/firewall in accordance with the present invention.

FIG. 9 depicts a data flow diagram 800 for system 300 initiated by a TP for the case where an NAT/firewall is interposed between a client-side application and a server-side application. Other call setup functions are also possible without affecting the present invention.

Figure 6:
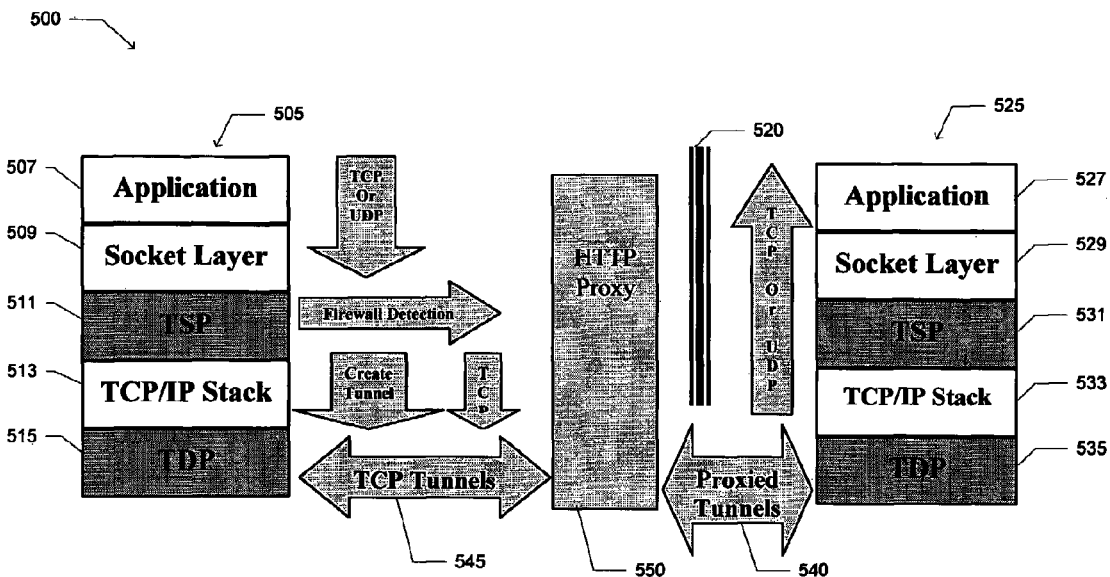

Reference is now made to FIG. 6, which depicts communication between devices on opposite sides of a firewall 520. In this embodiment, an HTTP proxy 550 is interposed between a source device 505 and destination device 525. Source device 505 and destination device 525 comprise network layers that perform application endpoint functions and that communicate data through to other layers. For purposes of this disclosure, the source device 505 is associated with a client and the destination device 525 is associated with a server. Other network configurations are possible, and such systems can easily be implemented in alternate configurations.

Source device 505 includes a source application layer 507, a source socket layer 509, source TSP 511, source TCP/IP stack 513 and source TDP 515. Destination device 525 includes a destination application layer 527, a destination socket layer 529, destination TSP 531, destination TCP/IP stack 533 and destination TDP 535. Various approaches for implementing and handling these layers of both devices are understood by those skilled in the art.

As described with respect to system 300, in the case of a server, the TSP of the service-side TP is configured to listen for TCP/IP connections on a determinable tunnel port. The description of the server-side TSP in system 300 will apply to the destination TSP 531 in that if device 525 were a client and not a server, the listener functionality is not needed.

The descriptions for the various of the source and destination devices 305 and 325 equally apply to the corresponding devices for the source and destination devices 505 and 525, respectively. For example, socket layers 509, 529 are used by the application layers 507, 527 to communicate TCP or UDP-based data. The TSP layers 511, 531 incorporate the TSP described above and perform firewall detection on a transport layer.

With reference still to FIG. 6, the presence of proxy 550 requires applications to simulate TCP connections, and the TP will only have control over one end of the connection at the stack level. TCP tunnels 545 support Type I and Type II data. UDP data tunneled within a TCP protocol can be communicated between the source device 505 and proxy 550.

During transmission, the proxy 550 may send back retransmit requests to the source device. Instead, the source device will send blank packets in place of the retransmission packets that can be easily identified as lost data so that the receiving side can discard it. To the proxy, this looks just like a normal retransmission of data and keeps traffic flowing. Further details are provided below.

Figure 10:
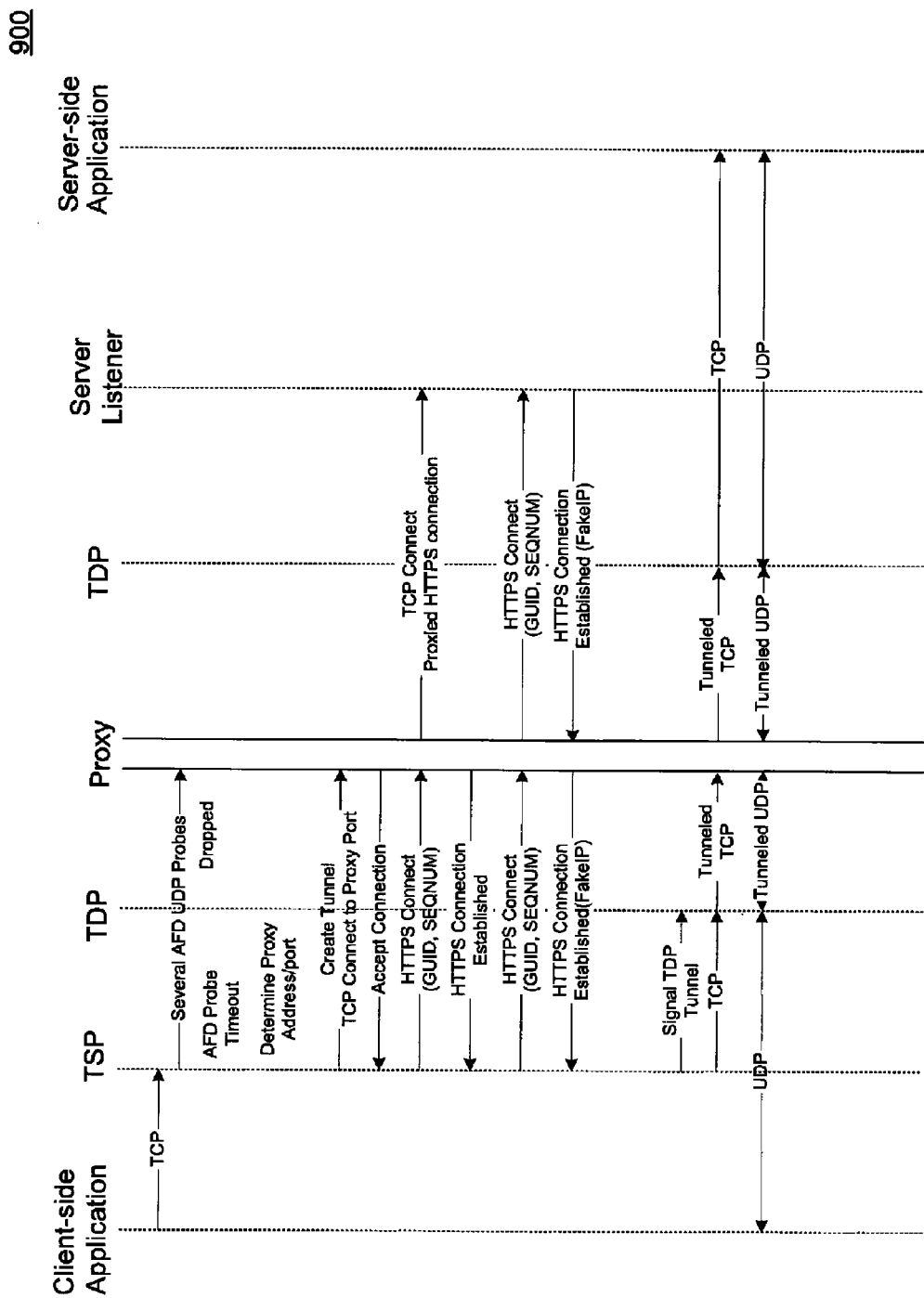
FIG. 10 represents a data flow diagram depicting an exchange of data between a client-server through a HTTP proxy in accordance with the present invention.

FIG. 10 depicts a representative data flow diagram 900 for system 500 initiated by a TP for the case where an HTTP proxy is interposed between a client-side application and a server-side application. The data flow is based on H.323 RAS used for registration but other registrations and call setup functions are also possible without affecting the present invention. Further details and process steps are provided later.

A user using embodiments described above will not likely know whether a plug-in is required on the application endpoint of the user. Accordingly, the need of a plug-in should be transparent to the user, and the installation of a plug-in should be automatic or otherwise occur "on the fly" and operate transparently with existing client applications.

Figure 11:
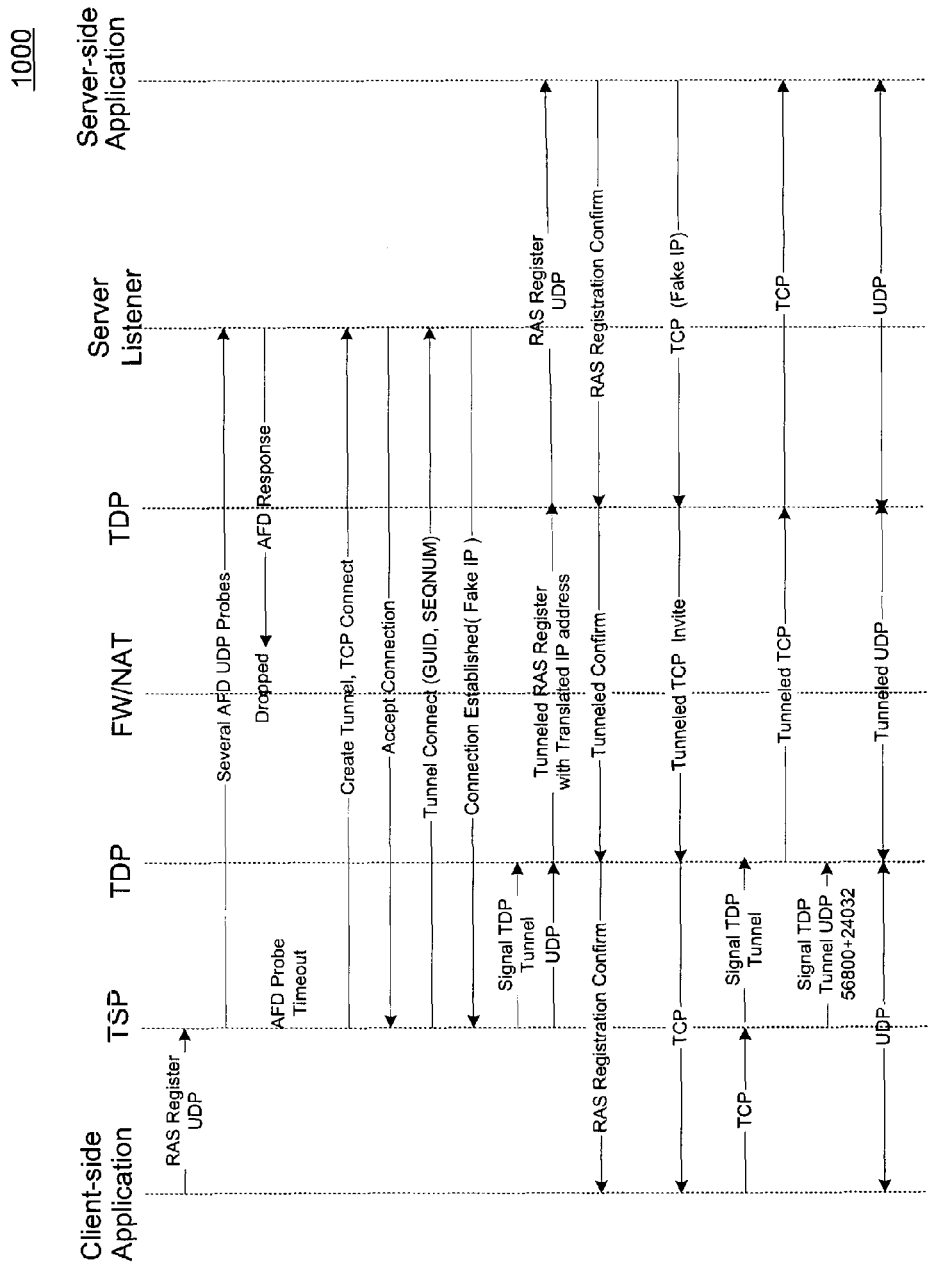
FIG. 11 represents a data flow diagram depicting an exchange of data between a client-conference server through a NAT/firewall in accordance with the present invention.

When a user is invited to or wants to participate in a session for a particular application but has nothing installed for that application (e.g. a video conferencing application or other desktop or device application for communicating voice, video or other communication to the user), it is preferable that a dynamic and user-transparent plug-in download occur automatically. In one embodiment, the plug-in can be a browser plug-in. The TP will be configured using specific logic for the application and will look for the specific TCP ports of the application in question. Then the desired application is launched. To illustrate, consider a case where a user receives a URL either by email, instant message or link on a web page. When the user activates the URL, if the user does not already have an installed application plug-in, the user's device automatically downloads the tunnel plug-in as a browser plug-in, and the tunnel plug-in is installed and configured for that application. Once the plug-in is installed, tunneling in accordance with the present invention can occur. FIG. 11 depicts a representative and preferred data flow diagram 1000 for a case where a client or client-side application establishes a persistent tunnel, receives an incoming call through a NAT/FW.

Once a plug-in is installed, automatic firewall detection (AFD) can be used to determine a configuration for reaching a server. A firewall detection sequence for firewall, NAT and proxy detection normally occurs when the application client first tries to communicate with a server. The sequence may be as simple as an application endpoint registering with a server or an actual connection with the server for an application session.

When a client attempts a connection or tries to send data, the TSP monitors predetermined destination ports used by an application and triggers an AFD sequence when one of these requests happens. In one AFD sequence, several test procedures may be initiated by sending data to the server over various ports. For example, test procedures could test for system configuration such as whether the system supports incoming UDP data, outgoing UDP data on a port with incoming data received on the same port (i.e., pin-holing), incoming TCP data, or outgoing TCP data.

If communication is established with the other end through one of the test procedures, the client can determine whether or not it is behind a NAT. If the test procedure indicates that the client is behind a NAT, the TP tunnels everything through a tunnel port.

If test procedures indicate that the client cannot access the destination with UDP but can get through on the tunnel port with TCP; the client tunnels through the tunnel port. If the client cannot create a tunnel to a desired destination, the AFD sequence may look at the local proxy settings. In any event, once an appropriate tunnel type is determined, a tunnel supporting Type I and Type II data is created. In a system with an HTTP proxy, a handshake may be simulated by the client/server to "fool" the proxy into thinking this is a true HTTPS (or TCP) connection. As a default, port 443 could be used.

Figure 4:
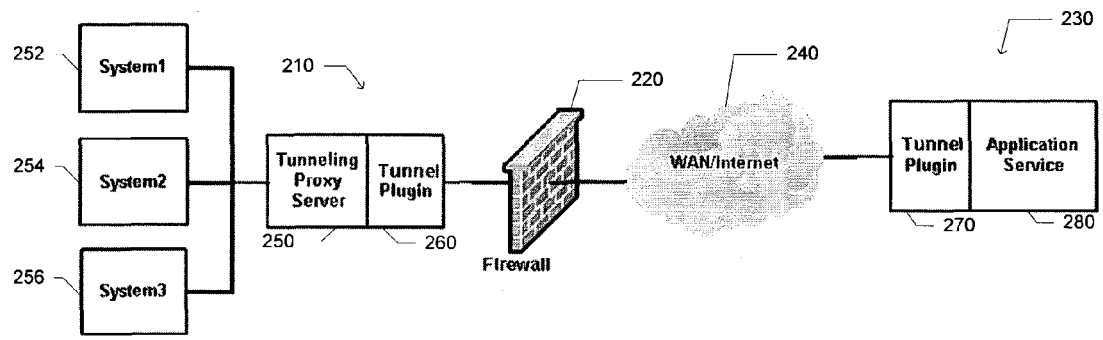
FIG. 4 shows a diagram of the a system for providing network communications in accordance with the invention, where a first endpoint communicates to another endpoint through a tunnel plug-in and a tunneling proxy server.

Depending on how the tunnels are to be created, tunnel plug-ins will operate one of the appropriate tunnel modes described with respect to FIGS. 4 and 5. It is also noted that for public networks such as the Internet, since the tunnel port could be the same port used by Web servers, one of the only ports opened through most firewalls, it is possible that protocols such as HTTP and HTTPS may be attempted from the client endpoint as well as other endpoints. If other endpoints that can reach the tunneling server without tunneling, with HTTP for example, the server must be able to differentiate this request from the tunneled requests.

Figure 3:
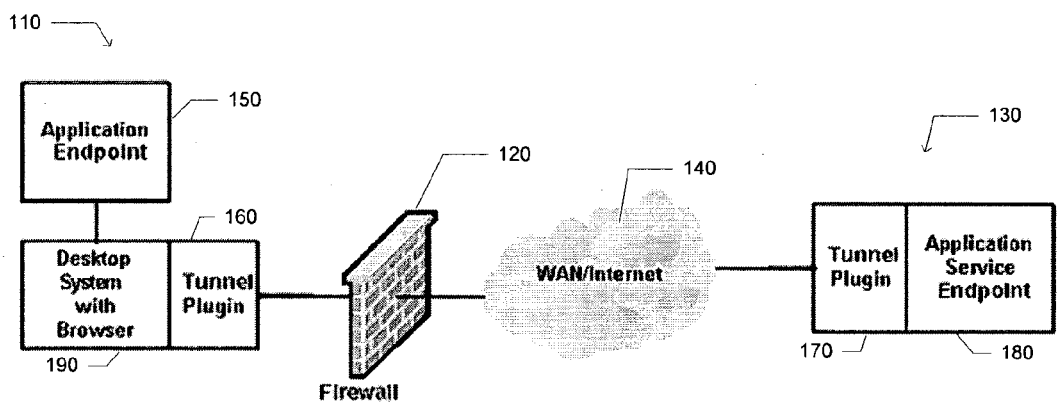
FIG. 3 shows a diagram of the a system for providing network communications in accordance with the invention, where a first endpoint communicates to another endpoint through a tunnel plug-in where a desktop browser system interposes the plug-in and application endpoint.

FIGS. 3 and 4 depict other possible configurations for using the tunnel plug-ins. In FIG. 3, a configuration is disclosed for providing a TP on a separate system with a personal proxy plug-in. FIG. 4 depicts a TP installed with a proxy server.

In FIG. 3, a firewall 120 separates a private network 110 from a public network 130. Here, the TP 160 is installed on a desktop system or other web-enabled device 190. TP 170 is installed at the application service endpoint 180. System 190 is coupled to an application endpoint 150. This application endpoint can be a closed system such as an application endpoint appliance like a presentation projector system. In this configuration the desktop system 190 acts as a proxy to the application endpoint appliance for purposes of providing the plug-in to the endpoint appliance 150. In this way, endpoint 150 is coupled via a web-enabled device 190 and via network 140 to the application service endpoint 180.

In FIG. 4, a firewall 220 separates a private network or client side 210 from a public network or server side 230. The TP 260 is installed on a tunneling proxy server 250. TP 170 is installed at the application service endpoint 180. The private network comprises multiple systems or devices 252, 254, 256. The tunnel proxy server 250 can be used to selectively allow or control access of private network devices 252, 254, 256 to the application service 280. Alternatively, proxy server 250 can enable all devices 252, 254, 256 with the tunneling functionality without each device having to install TP 260.

A detailed technique used to enable real time traffic to be tunneled through a TCP connection and behave as close to a direct IP connection can be accomplished and described using the following tunnel plug-in techniques and steps: intermediate system determination, tunnel connection establishment, traffic encapsulation, manipulation of sequence numbers and windows, and retransmission algorithms and efficient acknowledgement algorithms. The goal achieved using this series of techniques is a TCP/IP connection that does not inhibit the transmission of real time traffic by performing its normal reliable delivery and congestion avoidance algorithms. TCP/IP was designed to efficiently pass information in reliably in sequence with out regard to timing jitter.

Intermediate System Determination. Before a connection can be established that will be used to tunnel traffic, it must be determined if a tunnel is necessary. This determination is accomplished by passing test traffic through to the remote host and determining if the remote host can be reached directly by sending a UDP probe packet. The server side tunneling components will attempt to return this packet to the UDP source port+1. If the client does not receive this packet within a reasonable amount of time (configurable, but typically on the order of a few hundred milliseconds) a TCP (Default is HTTPS port 443) connection is established to the remote system.

Connection establishment. For TCP, a standard connection is typically established by intercepting a traffic request (such as an H.323 registration request) to a well-known (e.g. based on H.323) port. A TCP connection is defined by the port and address of both the originating endpoint (or its proxy) and the terminating endpoint (or its proxy). During this connection negotiation between the client and server tunneling components it is determined if an intermediate system is a firewall or an Internet proxy by passing TCP/IP sequence number information of the packet inside the packet and comparing the sequence number with the one inside the packet received by a server side tunnel listener. In determining the intermediate system, the TDP intercepts some outgoing data in the tunnel connection and places the sequence number of the packet in the application payload section where a placeholder is inserted at the application layer. If sequence numbers match then the connection is not terminated, and the system does not require timely acknowledgements. TCP/IP acknowledgements, described more fully below, insert acknowledgements (or ACKS) in the packets coming back in the reverse direction rather than sending just an ACK in a separate packet. This insertion is better than sending ACKS separately as a system would be forced to send twice as many packets.

Once a TCP tunnel is opened, the client side tunneler will not send any more traffic over the tunnel. Instead, the TCP tunnel will be used as a conduit to send tunneled traffic via the TDP. The TCP/IP stack will not be used again until tunnel connection shutdown.

Traffic encapsulation. Traffic encapsulation is achieved by capturing UDP and TCP/IP packets and wrapping them in a new header inside a TCP/IP frame. The information about the original packet is maintained in a partial header that contains IP address and port information for a UDP packet and the IP address, port and sequence number information for a TCP/IP packet. The new header is derived from an established connection and the resulting packet is then part of that connection. The data is piggybacked inside the connection making it possible for it to traverse firewalls, Internet proxies, etc., just as a HTTP/S connection may do. Note that the connection is a TCP/IP connection, and does not employ techniques that a normal connection would exhibit such as slow start, timer back off, round trip time estimation etc. These techniques are useful in the efficient operation of a connection-oriented protocol, but they are often counterproductive when trying to simulate a directly connected network.

Manipulation of Sequence Numbers. Sequence numbers are assigned as with any TCP/IP connection. When sending traffic, sequence numbers are incremented as traffic passes. No acknowledgments need be received (e.g., from an "ACK" flag in the TCP/IP header) in order for the client to continue sending data as would be done with TCP/IP. No timer back off is performed by the TCP stack since when data is ready, the data is sent immediately with the ACK and PUSH flags (which indicate if data is contained in a packet) set to ensure the data is immediately sent up the stack. The TCP/IP window size is preferably set by the TDP to the maximum value to ensure the remote system continues to send as much data as it needs to. When data is received all previous data is acknowledged even if it has not been received (i.e. the last sequence number is sent). This acknowledgment is to make sure that traffic continues to flow as it would in a direct IP network. If necessary, missing data can be dealt with by the higher-level protocols or the application depending on its type.

Retransmission algorithms and efficient acknowledgement algorithms. The algorithms discussed above are sufficient if the tunneling connection does not get terminated by an intermediate system (e.g., Internet proxy). If the intermediate system does terminate the connection, then two issues arise. The first relates to acknowledgements where since the intermediate system is terminating the connection the intermediate system will perform normal acknowledgment algorithms and will not send any traffic until it has received complete transmissions of data. In order to deal with this situation a sender could hold on to traffic and resend it, but this would be cumbersome for the sender and would not aid in the goal of emulating a directly connected network. In a directly connected network lost traffic does not get retransmitted unless the higher-level protocol resends it. UDP packets for instance, generally do not get retransmitted if they are lost. Therefore, the present approach does not employ a retransmission algorithm. Instead, the present approach utilizes an alternating bit pattern in place of the retransmission that can be easily identified as lost data so that the receiving side can discard it. To the proxy, this looks just like a normal retransmission of data and keeps traffic flowing. In case of selective retransmission requests, only the lost parts are sent.

On the receiving side the highest sequence number received is always sent in an acknowledgment flag (ACK) in order to keep information flowing. Since an Internet proxy that terminates the connection cannot be expected to maintain the boundaries of the encapsulated packets, partial packets will be received. These partial packets are transformed into IP fragments and sent up the receiving side of the stack. These fragments are then reassembled by the IP stack. This fragment technique eliminates the need for the tunneling implementation to have to deal with the buffering and discarding of fragments.

Turning to the acknowledgement process, there are at least two techniques for sending acknowledgments in the present invention. One is to acknowledge every received packet, the other is to piggyback acknowledgments on data flowing in the opposite direction. In the latter case, when one end of a connection is receiving but not sending data, the technique must determine when to send an acknowledgment before the TCP/IP window size is reached. Usually half a window size is used as a queue to send an acknowledgment so the other end will continue sending data. The percentage of the window size is preferably configurable at both ends.

Tunnels are shut down when no data has been sent through them for some period of time. Tunnels can be closed by sending a FIN (a standard TCP/IP way of ending a session) to the remote system. When the tunneling driver receives the FIN it frees all state information associated with the connection.

In either case, when a request is made for a connection or datagram to send to a destination IP and port, the following things will happen:

The TSP starts the automatic firewall detection (AFD) process, described above. If the AFD indicates that the two endpoints can send unsolicited UDP to each other, the TP lets the connection proceed normally.

If the endpoint cannot send unsolicited UPD to the other, the TSP will attempt to connect via TCP/IP to the configured tunnel port, which by default is the HTTPS port 443. If an HTTPS handshake can be performed or simulated then the TSP sends a tunnel connect message, formatted as a valid HTTPS connect for the ability to traverse an HTTP proxy. (For proxy traversal, the TSP must support the same browser based proxy detection, automatic, configuration script, or manual configuration). The tunnel connect messages contains the sequence number information mentioned in an earlier section. This message is used by the server side TDP to determine whether or not there is a proxy type device interposed between the application endpoint and application service endpoint, as well as a GUID (Globally Unique Identifier). The GUID is a string of bytes used to uniquely identify the client tunnel endpoint. A tunnel listener at an application service endpoint looks at the GUID and generates a unique IP address for the client. The GUID may be used later by the server to reuse the same IP address for that client.

If there is a proxy in between the client and server, the client will send a second connect message so it will make it all the way to the listener. Once this handshake is done, the connection stays up, but no more data is exchanged between the TSP or a tunnel listener. The TSP signals to the TDP which ports to tunnel and any data through those ports will get tunneled. FIG. 10 depicts a representative data flow diagram 900 initiated by a TP for the case where an HTTP proxy is interposed between a client and a server.

It is typical with some rich media communications protocols, for control and data to be exchanged through separate channels, as well as one or more separate destinations.

Figure 7:
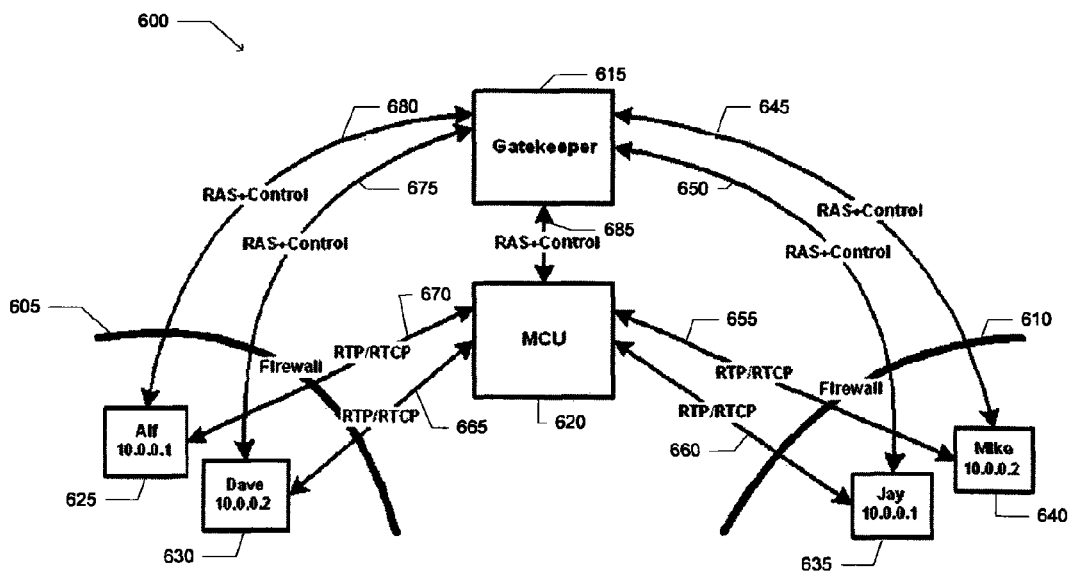
FIG. 7 shows a system of the present invention having multiple endpoints and a gatekeeper configurable for communicating to one another.

In system 600 of FIG. 7, firewalls 605 and 610 are configured so that only outgoing TCP connections are allowed and the gatekeeper is set to gatekeeper-routed mode. Tunnel plug-ins (not shown) are installed on endpoints 625-640 as well as the gatekeeper 615 and Multipoint Control Unit (MCU) 620. The MCU 620 and the gatekeeper 615 may be on separate machines with different IP addresses, but in any case communicate over channel 685. Tunnels are created from the endpoints 625-640 to the gatekeeper 615 when the endpoints 625-640 register with the gatekeeper 615.

In system 600, a client 625-640 registers with a gatekeeper 615. The registration does not necessarily require authentication but the client user provides some user name (e.g. Alf, Dave, Jay or Mike) and IP address (e.g. 10.0.0.1 and 10.0.0.2). When the tunnel listener or TSP on the gatekeeper's plug-in accepts a tunnel connection from the client, the listener will generate an alternate or "fake" IP address for the client side TP to use for packet translation, as well as to uniquely identify the tunnel for the server side application. In one embodiment, the gatekeeper will not see or keep track of the private IP addresses but will only see the "fake" addresses to associate with user names. If the gatekeeper needs to send data to a tunneled client, sending to the "fake" address will indicate to the TDP to tunnel the data to the appropriate client.

Once registered, a tunnel 655-670 will stay open as long as there is a packet transmission. Occasional activity as part of H.323 RAS messaging will keep a tunnel open.

Additionally, once the name and IP address are registered and tunnel created, an application service side server can initiate calls to a client 625-640 even if the client is behind a firewall at a private address. So long as a client 625-640 occasionally sends some data to the server side IP address, a tunnel 655-670 will stay open.

Once the tunnels to the gatekeeper are established, either an endpoint or the gatekeeper can initiate an H.323 call. Q.931 and H.245 control information is exchanged through the tunnel. These TCP-based tunnels are created as normal TCP connections but may multiplex one or more TCP connections requested by an application. All TCP connections requested by an application (i.e., H.323 control information like Q.931, T.120 channels, etc.) on a client or local machine are tunneled as Type I data connections.

A problem arises when the endpoints and the MCU want to exchange RTP-based (real-time transport protocol) media over channels 655-670, and the gatekeeper 615 and MCU 620 are on separate IP addresses. Both the client (client numbers here) and MCU 620 may start sending media at the same time, so some of the packets sent from the MCU 620 to the client endpoints 625-640 will not go anywhere until an endpoint sends at least one packet to open the tunnel to the MCU 620. Since the IP/ports match in each direction the tunnel plug-in on the MCU can easily find which tunnel to send the data on once it is opened. When a NAT is involved, however, the problem is more complicated.

RAS registrations register an IP with one or more aliases. The IP address that an endpoint will register is the local address, which generally will be a private address. This local address is typically unreachable from the outside a private network, as well as indistinguishable from private addresses from other private networks. When a call to a registered endpoint is placed, the gatekeeper 615 must resolve an alias to an IP address. In many cases, there would be multiple private addresses registered with different aliases with there being no way to distinguish one from the other.

To solve the problem of distinguishing addresses from one another, the TDP and TSP is configured to snoop some H.323 protocol messages and rewrite some of the address information embedded in the protocol.

When the TP server 615 detects a tunnel being opened from a NAT TCP client, the TP may be instructed to snoop the application protocol for that tunnel. This will activate a protocol specific module for the protocol in question. For H.323 from NAT clients, the following occurs.

First, RAS registrations 645, 650, 675, 680 are monitored by the server 615, and for each tunnel from a NAT client several items are monitored and maintained by the TP. For example, the TP stores the source address the tunnel came from and the private IP and alias information in the RAS Registration Request (RRQ). The TP will also re-write the packet and substitute a fake non-routable IP address for the private address from a normally unusable range, such as 128.x.x.x.

When the MCU server 620, gatekeeper 615, or an endpoint 625, 630, 635 or 640 tries to initiate a call, the call will be initiated with the generated address. Once the call gets to the gatekeeper TDP, the TDP will find the appropriate tunnel to match the generated address.

At some point before the RTP media channels are started, the TP server (gatekeeper 615 in this case) will have to send the generated address information back to TP client 625-640. The MCU will receive the generated address information when the client's RTP data causes a tunnel to be opened to the MCU. When the MCU 620 tries to send RTP to the generated address, the MCU TP will match this with the recent incoming tunnel from the TP client and know where to send the media.

The system 600 is particularly useful in establishing various conferencing features. For example, suppose a user wishes to join or be invited in to an existing conference. Multiple tunnels may need to be generated to the gatekeeper 615 and the MCU server 620 (acting as a conferencing server) to support multiple communication tunnels. In one approach, clients 625-640 register with gatekeeper 615 and receives a "fake" IP address assigned to a client's TSP by the gatekeeper TP to use as an IP address.

Figure 12:
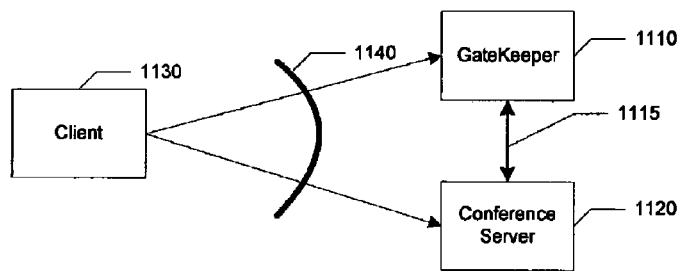
FIG. 12 depicts a system incorporating the present invention as part of conference server and gatekeeper network.

FIG. 12 depicts a simplified version where two or more tunnels can be established to more than one service. In system 1100, a client 1130 is separated from a gatekeeper 1110 and a conference server 1120 by a firewall, NAT or proxy 1140. Gatekeeper 1110 corresponds to gatekeeper 615 and conference server 1120 corresponds to MCU server 620. The gatekeeper 1110 and conference server 1120 are coupled over line 1115.

Service is established to the gatekeeper and conference server by the client 1130 through tunnels created and maintained by TP in accordance with the present invention. The client 1130 can register with gatekeeper 1110 over a tunnel established, for example, in accordance with the data flow diagram in FIG. 11. In such a case, the client 1130 will receive back a generated "fake" IP for the TSP to of the client 1130 to use as an IP address.

To join an existing conference, a client could connect directly to the conference through NAT/firewalls as a client could do as described with respect to system 300. The server 620 receives the "fake" IP address from the client. This fake IP address is used by the gatekeeper TP to differentiate duplicate private addresses and associate specific clients with specific tunnels. The gatekeeper 615 and server 620 see the same IP address for any client.

In the case where a client is invited by the system to a conference, an invitation may come from the gatekeeper for which there would already be a tunnel allowing the incoming invitation through the firewall/NAT/proxy. The invitation could contain the destination server 620 to connect to so that the client would be establishing a tunnel similar to system 300. In the case of H.323 or SIP protocol, the client-side TSP must parse H.245 messages or SIP invites from the gatekeeper 615 or SIP proxy to find out the RTP and RTCP addresses the conferencing server 620 is expecting to use.

Figure 8:
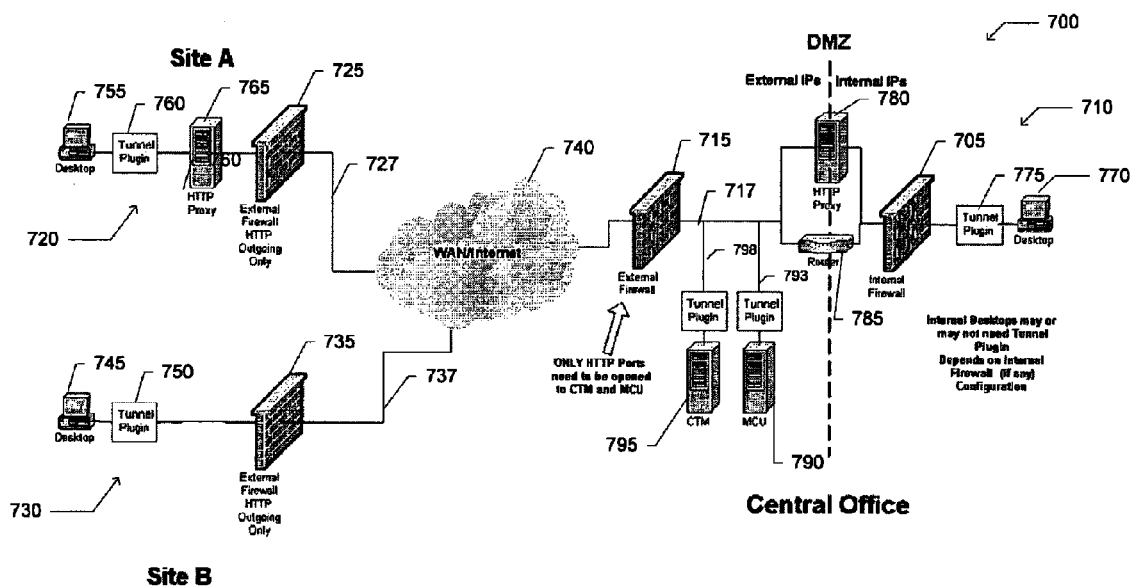
FIG. 8 shows a system with a TP of the present invention deployed as part of a corporate site.

Another advantage of tunneling in accordance with the present invention is that one can deploy services with clients having different firewall protection. For example, the TP can be installed on different client endpoints even if some clients are behind a NAT/firewall and others are configured with a proxy server. Additionally, on the application server side or a corporate network side, the TP can be easily installed on corporate sites. To highlight both of these advantages, reference is made to FIG. 8 where the present invention is deployed in a multi-site configuration 700.

A central office 710 is coupled to a plurality of sites 720, 730 through network 740. A first site 720 contains a desktop client 755 coupled to TP 760. Site 720 is coupled to network 740 over connection 727, which such connection can be similar to connections 62', 64' described earlier. Site 730 contains a desktop client 745 coupled to TP 750. Site 730 is coupled to network 740 over connection 737, which such connection can be similar to connections 62', 64' described earlier.

Site 720 corresponds to system 500 in that client 755 is separated from a firewall 725 by HTTP proxy 765. Site 730 corresponds to system 300 in that plug-in 750 is coupled to a firewall 735 without an intervening HTTP proxy. The application of the TP of the present invention can be installed on each client endpoint (or, for example, on an external server serving multiple clients at a site, as in the case depicted in FIG. 4) and support other multiple client configurations. However, depending on the corporate configuration, in accordance with the teachings provided herein, the desktop 770 may or may not need TP 775 installed. For example, we again refer to a case of a server already having the TP installed serving multiple clients at a site not having the TP installed, as in the case depicted in FIG. 4.

Central office side 710 may include one or more office desktops 770. TP 775 can be installed on desktop 770 to enable a desktop application to transmit and receive voice, video, and other data over the Internet 740 and allowing the exchange of HTTP, TCP/IP and UDP type data packets through tunnel connections created between the desktop and devices on other sides of a firewall 705 or 715.

Proxy 780 and router 785 act as a DMZ network inserted between a company's private network 710 and the outside public network 740. The DMZ allows outside users to get access to a service. Corporate networks commonly utilize a DMZ network to deploy certain services but prevent external devices from accessing internal IP addresses. Since the DMZ is often separated from internal or external users by a proxy, firewall or NAT, TP 775 can be installed on devices in the DMZ.

Additionally, DMZs themselves are commonly separated from network 740 by a firewall 715. Connections 717, 793, 798 and connections to the network 740 from firewall 715 are similar to connections 62', 64', described above. Corporate network 710 may be coupled to an external server, such as a MCU or conferencing server 790. MCU 790 is preferably similar in all respects to MCU 620 described above. Similarly, a gateway server 795 may be coupled to the corporate network 710 and similar in all respects to the server 615 described above. MCU 790 and server 795 may have TPs installed to support tunneling through a firewall (e.g., firewall 705) proxy, or a NAT in accordance with the present invention. For example, tunnels may be created and maintained between TPs on servers 790, 795 and the TP 775 for desktop 770 through firewall 705. Additionally, tunnels may be created and maintained between TPs on servers 790, 795 and a TP 760 and/or TP 750 on open HTTP ports on firewall 715.

In any event, the present invention adapts very well to a variety of private and corporate networks.

As previously described, a TP configuration in accordance with the present invention, such as TP 750, 760 and 775 can be downloaded and installed only when needed (e.g., based on a test procedure), and such download and install will be transparent to the client or user.

Additionally, for any configuration a TP install can take place on each endpoint and/or external server of a configuration to support tunneling without the requirement of a separate system gateway/proxy or user registration process.

Further, the novel TP approach taught can support virtually any case of packet blockage by a firewall, proxy or NAT. For example, when either an intended sender or recipient of data utilizes a computer device that is protected by a firewall that does not allow transmissions of data using connectionless packet protocol and connection-based protocol, a tunnel can be created and maintained in accordance with the present invention by wrapping the connectionless and connection-based protocol in a connection-based protocol that is permitted to pass the firewall. The plug-in components interact and operate to emulate real-time or connection based transfer for both connection and connectionless protocol. In this way, UDP-like performance (i.e., unreliable datastream) can be supported over a TCP connection. For example, the driver and transport layer plug-ins can support tunnel path simulating a TCP connection in part by sending acknowledgment and appropriate synchronization packets to fool firewalls and other devices into responding to the packets as if the packets were TCP.

Additionally, for transmissions that do not perform or behave well through NATs, the plug-in can have specific logic for applications to translate packets and solve the NAT problems.

Figure 13:
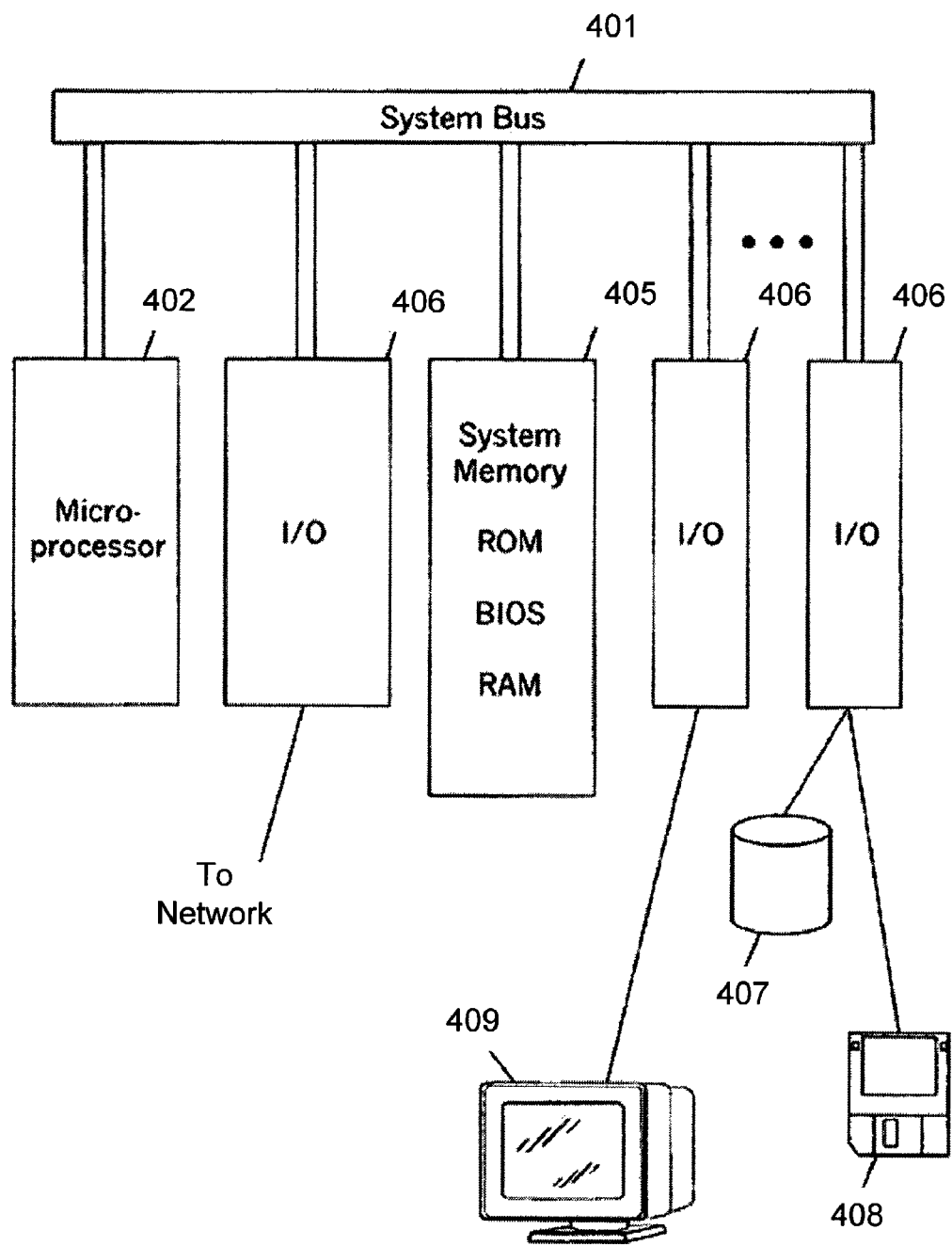
FIG. 13 illustrates details of a computer system that is implementing the invention.

The invention can be implemented through computer program code operating on a programmable computer system or instruction execution system such as a personal computer or workstation, or other microprocessor-based platform. FIG. 13 illustrates details of a computer system that is implementing the invention. System bus 401 interconnects the major components. The system is controlled by microprocessor 402, which serves as the central processing unit (CPU) for the system. System memory 405 is typically divided into multiple types of memory or memory areas such as read-only memory (ROM), random-access memory (RAM) and others. The system memory may also contain a basic input/output system (BIOS). A plurality of general input/output (I/O) adapters or devices 406 are present. Only three are shown for clarity. These connect to various devices including a fixed disk drive 407 a diskette drive 408, network 410, and a display 409. Computer program code instructions for implementing the functions of the invention are stored on the fixed disk 407. When the system is operating, the instructions are partially loaded into memory 405 and executed by microprocessor 402. Optionally, one of the I/O devices is a network adapter or modem for connection to a network, which may be the Internet. It should be noted that the system of FIG. 13 is meant as an illustrative example only. Numerous types of general-purpose computer systems are available and can be used.

Elements of the invention may be embodied in hardware and/or software as a computer program code (including firmware, resident software, microcode, etc.) Furthermore, the invention may take the form of a computer program product on a computer-usable or computer-readable storage medium having computer-usable or computer-readable program code embodied in the medium for use by or in connection with an instruction execution system such as those shown in FIG. 13. A computer-usable or computer-readable medium may be either a computer-usable or computer-readable storage medium or computer-usable or computer-readable transmission medium. A computer-usable or computer-readable storage medium can be any medium that can contain, store, or communicate the program, code, etc. and a computer-usable or computer-readable transmission medium an be any medium that can transport the program, code, etc., for use by or in connection with an instruction execution system. The computer-usable or computer-readable medium can be, for example, an electronic, magnetic, optical, electromagnetic, infrared, or semiconductor system. The medium may also be simply a stream of information being retrieved when the computer program product is "downloaded" through a network such as the Internet.

Finally, although specific embodiments of the invention have been described and illustrated, the invention is not to be limited to the specific forms or arrangements of parts as described and illustrated herein. For instance, it should also be understood that throughout this disclosure, where a software process or method is shown or described, the steps of the method may be performed in any order or simultaneously, unless it is clear from the context that one step depends on another being performed first.

The present invention is directed to certain aspects within the communication exchange between endpoints. Other details not provided regarding other system hardware and software requirements are not required for implementing the present invention as the present invention can operate and is configurable with any OS or applications by one skilled in the art.

Although the invention has been described with reference to the specific embodiments, it will be apparent to one skilled in the art that variations and modifications are contemplated within the spirit and scope of the invention. The drawings and descriptions of the specific embodiments are made by way of example only, rather than to limit the scope of the invention, and it is intended to cover within the spirit and scope of the invention all such changes and modifications.

What is claimed is:

1. A computer program product for use in conjunction with a computer device, the computer program product comprising a non-transitory computer-readable storage medium and a computer program product mechanism embodied therein that causes the computer device to perform data transfers across a security device interposed between the computer device and a second computer device, the computer program product having:
   computer program codes to cause a gatekeeper computer device to monitor requests for data transfer to one or more determinable ports of an endpoint computer device, wherein the monitoring includes detecting whether a network security device is interposed between the gatekeeper computer device and the endpoint computer device;
   computer program codes to cause the gatekeeper computer device to create a first data channel to the endpoint computer device in response to the detection of the network security device, wherein data communicated over the first data channel is transmitted using a connection-based protocol;
   computer program codes to cause the gatekeeper computer device to, in response to detecting a registration request from the endpoint computer device, substitute private address information associated with the endpoint computer device in the registration request with alternate address information and transmit the alternate address information to the endpoint computer device;
   computer program codes to cause the gatekeeper computer device to, in response to detecting a request to participate in a conference, initiate the conference using the alternate address information and instructing the endpoint computer device to create a second data channel to a conference server and provide the conference server with the alternate address information, wherein the computer program codes are further configured, for the data transmitted in the conference, to:
   intercept data destined for one or more determinable destination ports of the endpoint computer device, wherein the intercepted data comprises packets of a connectionless protocol;
   encapsulate the intercepted packets of the connectionless protocol within payload packets of a connection-based protocol and to send the encapsulated data to the endpoint computer device via the first data channel; and
   in response to receiving a retransmission request for at least a portion of the encapsulated data from the endpoint computer device, transmit identifier packets of dummy packets or packets of a known sequence to the endpoint computer device, wherein the identifier packets satisfy the retransmission request and direct the endpoint computer device to discard the identifier packets;
   further comprising computer program codes to cause the gatekeeper computer device to perform a security device detection process to determine whether establishment of the data channel is necessary.

2. The computer program product of claim 1, wherein the intercepted data comprises packets of a connection-based protocol.

3. The computer program product of claim 1, wherein the identifier packets include an alternating bit pattern.

4. The computer program product of claim 1, wherein the gatekeeper computer device is a server coupled to one or more client endpoints.

5. The computer program product of claim 4, further comprising computer program codes to cause the gatekeeper computer device to receive connectionless-based data from the client endpoints.

6. The computer program product of claim 5, further comprising computer program codes to cause the gatekeeper computer device to send connectionless-based data to the client endpoints.

7. The computer program product of claim 1, further comprising computer program codes to cause the gatekeeper computer device to receive connectionless-based data from and transmit connectionless-based data to an application endpoint appliance.

8. A computer program product for use in conjunction with a computer device, the computer program product comprising a non-transitory computer-readable medium and a computer program product mechanism embodied therein that causes the computer device to perform data transfers across a proxy interposed between the computer device and a second computer device, the computer program product having:
   computer program codes to cause a gatekeeper computer device to monitor requests for data transfer to one or more determinable ports of the an endpoint computer device, wherein the monitoring includes detecting whether a network security device is interposed between the gatekeeper computer device and the endpoint computer device;
   computer program codes to cause the gatekeeper computer device to create a first data channel by transmitting a tunnel connect message to the endpoint computer device in response to the detection of the network security device, wherein the tunnel connect message includes sequencing information, wherein data communicated over the first data channel is transmitted using a connection-based protocol;
   computer program codes to cause the gatekeeper computer device to determine whether the proxy is interposed between the gatekeeper computer device and an endpoint computer device based at least on the tunnel connection message and the sequencing information;
   computer program codes to cause the gatekeeper computer device to, in response to detecting a registration request from the endpoint computer device, substitute private address information associated with the endpoint computer device in the registration request with alternate address information and transmit the alternate address information to the endpoint computer device;
   computer program codes to cause the gatekeeper computer device to, in response to detecting a request to participate in a conference, initiate the conference using the alternate address information and instructing the endpoint computer device to create a second data channel to a conference server and provide the conference server with the alternate address information, wherein the computer program codes are further configured, for the data transmitted in the conference, to:
   intercept data destined for one or more determinable destination ports of the endpoint computer device, wherein the intercepted data comprises packets of a connectionless protocol;
   encapsulate the intercepted packets of the connectionless protocol within payload packets of a connection-based protocol and to send the encapsulated data to the endpoint computer device via the first data channel; and
   in response to receiving a retransmission request for at least a portion of the encapsulated data from the endpoint computer device, transmit identifier packets of dummy packets or packets of a known sequence to the endpoint computer device, wherein the identifier packets satisfy the retransmission request and direct the endpoint computer device to discard the identifier packets;
   further comprising computer program codes to cause the gatekeeper computer device to perform a security device detection process to determine whether establishment of the data channel is necessary.

9. The computer program product of claim 8, wherein the intercepted data comprises packets of a connection-based protocol and packets of a connectionless protocol.

10. The computer program product of claim 8, wherein the gatekeeper computer device is a server coupled to one or more client endpoints.

11. The computer program product of claim 10, further comprising computer program codes to cause the gatekeeper computer device to receive connectionless-based data from the client endpoints.

12. The computer program product of claim 11, further comprising computer program codes to cause the gatekeeper computer device to send connectionless-based data to the client endpoints.

13. The computer program product of claim 8, further comprising computer program codes to cause the gatekeeper computer device to receive connectionless-based data from and transmit connectionless-based data to an application endpoint appliance.

14. A method of transferring data from a first computer device to a second computer device, the method comprising:
   monitoring requests for data transfer to one or more determinable ports of an endpoint computer device, wherein the monitoring includes detecting whether a network security device is interposed between a gatekeeper computer device and the endpoint computer device;
   creating a first data channel to the endpoint computer device in response to the detection of the network security device, wherein data communicated over the first data channel is transmitted using a connection-based protocol;
   in response to detecting a registration request from the endpoint computer device, substituting private address information associated with the endpoint computer device in the registration request with alternate address information and transmitting the alternate address information to the endpoint computer device;
   in response to detecting a request to participate in a conference, initiating the conference using the alternate address information and instructing the endpoint computer device to create a second data channel to a conference server and provide the conference server with the alternate address information; wherein data for the conference is transmitted by:
   intercepting data destined for one or more determinable destination ports of the endpoint computer device, wherein the intercepted data comprises packets of a connectionless protocol;
   encapsulating the intercepted packets of the connectionless protocol within payload packets of a connection-based protocol and to send the encapsulated data to the endpoint computer device via the first data channel; and
   in response to receiving, a retransmission request for at least a portion of the encapsulated data from the endpoint computer device, transmitting identifier packets of dummy packets or packets of a known sequence to the endpoint computer device, wherein the identifier packets satisfy the retransmission request and direct the endpoint computer device to discard the identifier packets;

further comprising performing a security device detection process to determine whether establishment of the data channel is necessary.

15. The method of claim 14, wherein the intercepted data comprises packets of a connection-based protocol.

16. The method of claim 14, wherein the identifier packets include an alternating bit pattern.

17. The method of claim 14, wherein the gatekeeper computer device is a server coupled to one or more client endpoints.

18. The method of claim 17, further comprising receiving connectionless-based data from the client endpoints.

19. The method of claim 18, further comprising sending connectionless-based data to the client endpoints.

20. The method of claim 14, further comprising receiving connectionless-based data from and transmit connectionless-based data to an application endpoint appliance.

* * * * *